E. B. RIDGWAY.
CHECK VALVE.
APPLICATION FILED OCT. 27, 1917.

1,260,058.

Patented Mar. 19, 1918.
3 SHEETS—SHEET 1.

Inventor
Ellis B. Ridgway.
by his Attorneys.
Howson & Howson

E. B. RIDGWAY.
CHECK VALVE.
APPLICATION FILED OCT. 27, 1917.
1,260,058.
Patented Mar. 19, 1918.
3 SHEETS—SHEET 2.
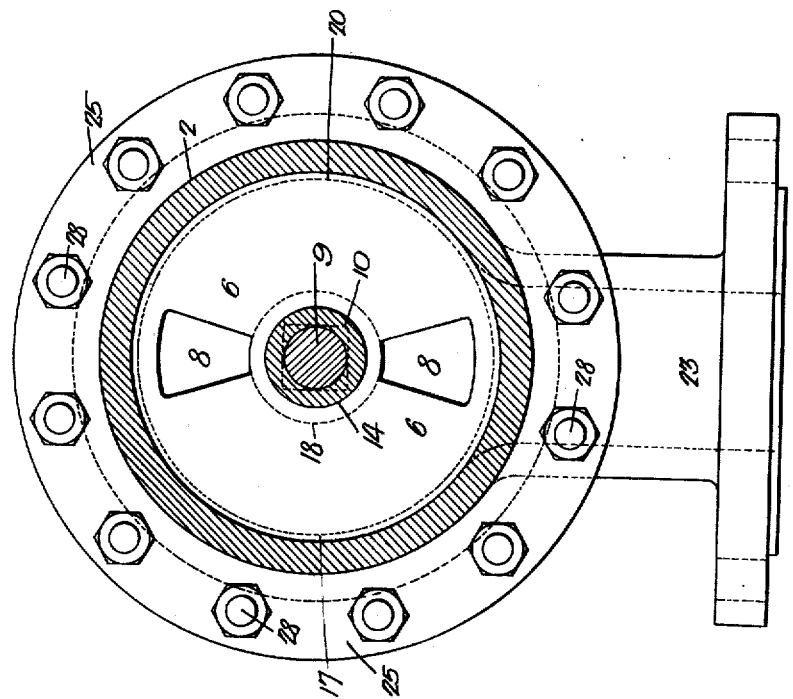
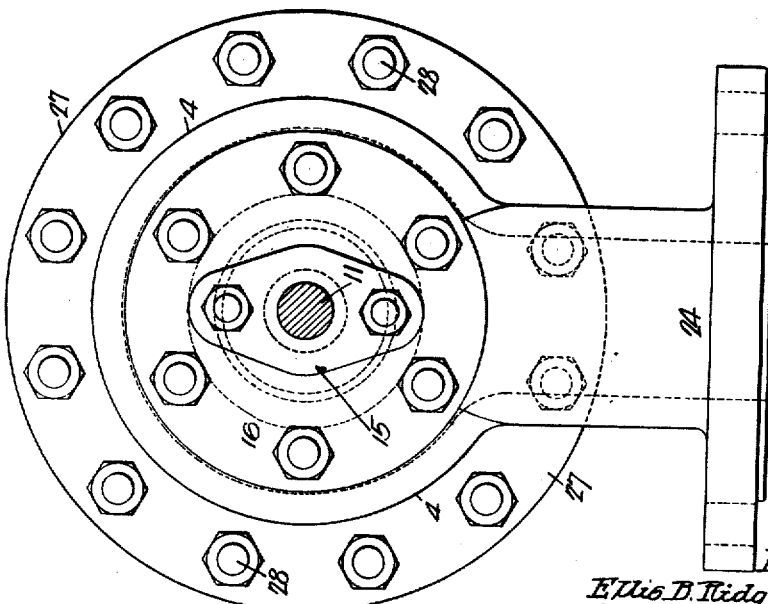
Inventor
Ellis B. Ridgway,
by his Attorneys
Howson & Howson

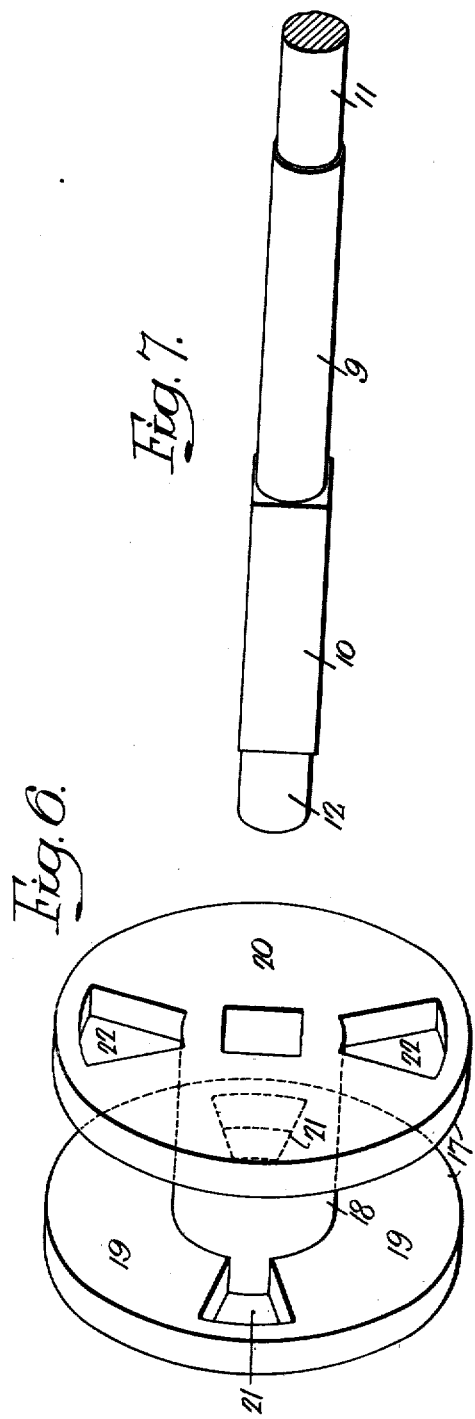
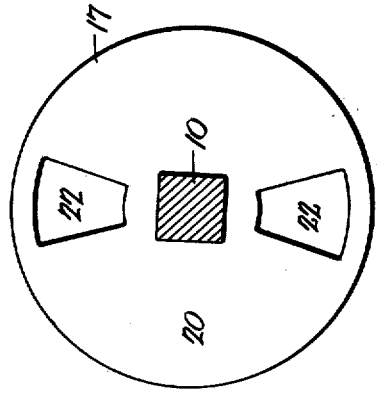
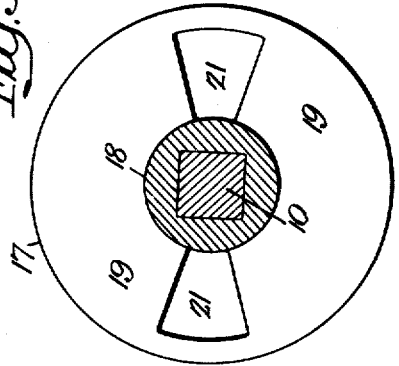

UNITED STATES PATENT OFFICE.

ELLIS B. RIDGWAY, OF COATESVILLE, PENNSYLVANIA.

CHECK-VALVE.

1,260,058.  Specification of Letters Patent.  Patented Mar. 19, 1918.

Application filed October 27, 1917. Serial No. 198,857.

*To all whom it may concern:*

Be it known that I, ELLIS B. RIDGWAY, a citizen of the United States, and a resident of Coatesville, Chester county, Pennsylvania, have invented certain Improvements in Check-Valves, of which the following is a specification.

My invention relates to certain improvements in check valves, particularly adapted for use in connection with steam hydraulic elevators, but it will be understood that the invention can be used in connection with other mechanism where a valve of this type is required without departing from the essential features of the invention.

One object of my invention is to construct a simple and effective valve, which will operate quickly when the pressure is in either direction.

A further object of the invention is to construct the valve so that it will have an independent longitudinal movement in order to act as a check and to provide means to give it a rotary motion to shift the ports.

In the accompanying drawings:

Fig. 2 is an end view;

Fig. 3 is a sectional view on the line 3—3, Fig. 1;

Fig. 4 is an end view of the valve detached;

Fig. 5 is a sectional view of the valve on the line 5—5, Fig. 1;

Fig. 6 is a detached, perspective view of the valve, and

Fig. 7 is a detached, perspective view of the valve stem.

Figure 1:
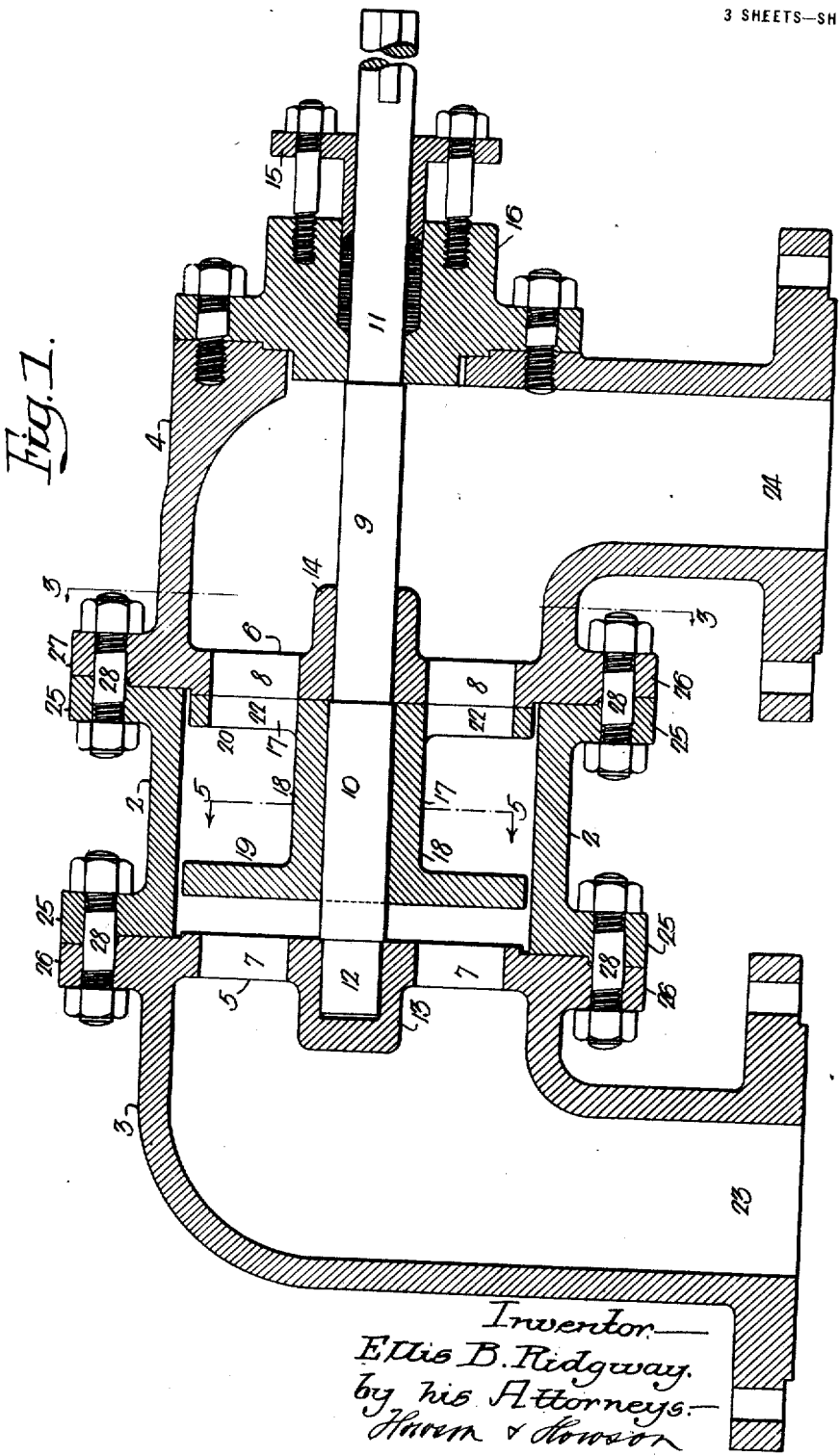
Figure 1 is a longitudinal sectional view of my improved check valve.

As hereinbefore stated, this invention is particularly designed for use in connection with a steam-hydraulic elevator, in which the flow of water is controlled by the admission of steam to a cylinder and consists of a casing made in three parts 2, 3 and 4. In the parts 3 and 4 are the diaphragms 5 and 6, respectively, having ports 7 and 8, respectively. 9 is a spindle having a squared portion 10 and reduced portions 11 and 12. The portion 12 is adapted to a bearing 13 in the diaphragm 5, while the main portion of the spindle is adapted to a bearing 14 in the diaphragm 6 and the reduced portion is adapted to a stuffing box 15 of the ordinary type carried by the removable head 16. Mounted on the squared portion of the valve stem 10 between the two diaphragms 5 and 6 is a valve 17, less in length than the space between the two diaphragms, as clearly shown in Fig. 1. The valve has a head 18 and two disks 19 and 20. In the disk 19 are ports 21 at right angles, in the present instance, to the ports 22 in the disk 20.

The valve can be turned by any suitable handle attached to the end of the spindle 9 so as to bring the ports 22 in alinement with the ports 8, or the ports 21 in alinement with the ports 6. When the valve is in the position illustrated in Fig. 1, for instance, and its disk 20 is against the diaphragm 6, then the water will freely flow through the ports 7, around the disk 19 of the valve 17, through the ports 22 and 8, but if back pressure occurs then the valve moves immediately on the stem 10 and as the solid portion of the disk 19 is opposite the port 7, the port 7 will be closed, preventing further flow of fluid through the valve in the previous direction until the forward pressure overcomes the back pressure, when the valve will again slide forward on its spindle, assuming the position illustrated in Fig. 1. When the fluid is flowing in the reverse direction, then the valve 17 is turned by turning the spindle so as to bring the ports 21 in alinement with the ports 7 of the diaphragm 5. This movement shifts the ports 22 out of alinement with the ports 8, consequently, the valve will be moved against the diaphragm 5, and the flow of fluid will continue until the back pressure is sufficient to cause the valve to slide on its spindle and the disk 20 will be forced against the diaphragm 6, closing the ports 8.

The passages 23 and 24 in the casing may be in any position desired, depending considerably upon the mechanism to which the valve is coupled.

In the present instance, the three sections of the casing 2, 3 and 4 have flanges 25, 26 and 27, and bolts 28 extend through these flanges and firmly hold the sections together, and in Fig. 1 the diaphragms are shown as made integral with the sections 3 and 4, but they may be made separate and confined between the sections, if desired. It will be understood that the construction of the casing may be modified without departing from the essential features of the invention.

I claim:

1. The combination in a check valve, of a casing having two diaphragms spaced apart; ports in said diaphragms; a check valve mounted between the two diaphragms and less in length than the distance between the two diaphragms, the valve having ports out of line with each other; means for turning the valve; and means for allowing the valve to have an independent longitudinal sliding movement so that when one of the ports of the valve is in alinement with one of the ports in the diaphragm, the other will be closed by the valve moving longitudinally when the back pressure overcomes the forward pressure.

2. The combination of a casing having two diaphragms spaced apart; ports in each diaphragm; a spindle mounted in bearings in the diaphragm and having a squared portion; a valve loosely mounted in the squared portion of the spindle and having ports at one end out of line with the ports at the opposite end thereof, so that when the valve is turned to bring one set of ports of the valve in alinement with one diaphragm, the other ports of the valve are out of alinement with the other diaphragm so as to allow the valve to close the ports in the last mentioned diaphragm when the valve is moved by back pressure.

3. The combination of a valve casing made in three parts, a central part and two end parts having ports therein and having two diaphragms, said diaphragms having ports; a spindle mounted in the valve casing and having a squared portion; a valve mounted in the space between the diaphragms, said valve being less in length than the space between the two diaphragms and arranged to slide on the squared portion of the spindle, said valve consisting of a hub and two flanges; ports in the two flanges, the ports of one flange being out of alinement with the ports of the other flange.

4. The combination in a check valve, of a casing made in three parts; a diaphragm formed integral with each end part, both the end parts and the central part having flanges; bolts securing the flanges together, the diaphragm having two ports, one set of ports being in alinement with the other set of ports; a valve spindle mounted in the bearings on the diaphragms; and a stuffing box through which the stem passes; a valve mounted on the stem, the valve being less in length than the distance between the two diaphragms and capable of moving longitudinally independently of the spindle but controlled by the spindle, said valve having two disks, each disk having two ports therein out of line with each other and so arranged that when one set of ports of the valve is in alinement with one set of ports of one diaphragm, the other set of ports of the valve is out of alinement with the ports of the other diaphragm.

In witness whereof I affix my signature.

ELLIS B. RIDGWAY.